(12) United States Patent
Valeriano et al.

(10) Patent No.: US 7,741,967 B2
(45) Date of Patent: Jun. 22, 2010

(54) LOCATING SYSTEM FOR ITEMS HAVING RFID TAGS

(75) Inventors: Francisco M. Valeriano, Torrance, CA (US); Sabrina Pui-Wah Matsunaga, Oak Park, CA (US); Amos Y. Kuo, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1166 days.

(21) Appl. No.: 11/352,674

(22) Filed: Feb. 13, 2006

(65) Prior Publication Data
US 2007/0188342 A1    Aug. 16, 2007

(51) Int. Cl.
G08B 1/08 (2006.01)
H04Q 5/22 (2006.01)
B60Q 1/00 (2006.01)

(52) U.S. Cl. .................... 340/539.11; 340/539.13; 340/539.21; 340/457; 340/10.1; 455/456.1; 370/328; 235/385

(58) Field of Classification Search ............ 340/539.11, 340/539.13, 539.21, 573, 457, 825.49, 10.1; 455/456.1; 370/328; 235/385, 375, 383
See application file for complete search history.

(56) References Cited

U.S. PATENT DOCUMENTS

| | | | | |
|---|---|---|---|---|
| 6,600,418 B2 * | 7/2003 | Francis et al. | ............. | 340/572.1 |
| 6,750,769 B1 | 6/2004 | Smith | ...................... | 340/572.1 |
| 6,859,485 B2 * | 2/2005 | Belcher | ...................... | 375/130 |
| 6,924,741 B2 * | 8/2005 | Tamayama et al. | ........ | 340/572.1 |
| 7,152,791 B2 * | 12/2006 | Chappidi et al. | ............ | 235/385 |
| 7,245,221 B2 * | 7/2007 | Claudatos et al. | ......... | 340/572.1 |
| 7,246,746 B2 * | 7/2007 | McNamara et al. | ......... | 235/385 |
| 7,388,491 B2 * | 6/2008 | Chand et al. | ............. | 340/572.1 |

(Continued)

OTHER PUBLICATIONS

"Paper-based Communicating Objects in the Future Office" by Damián Arregui, Christer Fernstrom, François Pacull, Gilbert Rondeau and Jutta Willamowski; Xerox Research Centre Europe; and Elisabeth Crochon, François Favre-Reguillon; CEA Leti; 10 pages.

(Continued)

*Primary Examiner*—Brian A. Zimmerman
*Assistant Examiner*—Nam V Nguyen
(74) *Attorney, Agent, or Firm*—Alix, Yale & Ristas, LLP

(57) ABSTRACT

A locating system for an archive having multiple objects stored therein includes an RFID reader device having an RFID reader to detect and read RFID tags on the objects. A central processing unit includes a database to store information on each object in the archive, a location engine operating system in communication with the RFID reader device, and a data structure to store a relative position of each object in the archive relative to each other object in the archive. A method of locating an object within an archive containing multiple objects includes carrying an RFID reader device through the archive. The RFID reader device queries each RFID tag for the identifier associated with the RFID tag and determines whether each identifier is an old identifier stored in a memory or a new identifier not stored in the memory. If one or more of the identifiers is a new identifier, a linkage is defined between each object associated with a new identifier and each other object within the range of the RFID reader device. Each linkage is saved in a data structure and each new identifier is stored in the memory.

8 Claims, 6 Drawing Sheets

U.S. PATENT DOCUMENTS

| | | | |
|---|---|---|---|
| 7,409,220 B2 * | 8/2008 | Belcea | 455/457 |
| 7,540,419 B2 * | 6/2009 | Amitay et al. | 235/385 |
| 2005/0107953 A1 | 5/2005 | Sugla | 701/300 |
| 2006/0022038 A1 * | 2/2006 | Hewlin et al. | 235/385 |
| 2007/0032245 A1 * | 2/2007 | Alapuranen | 455/456.1 |

OTHER PUBLICATIONS

"Privacy and Security in Library RFID Issues, Practices, and Architectures" by David Molnar and David Wagner; CCS '04, Oct. 25-29, 2004, Washington, DC USA; Copyright 2004 ACM 1-58113-961-6/04/0010; 4 pages.

* cited by examiner

LOCATING SYSTEM FOR ITEMS HAVING RFID TAGS

BACKGROUND

This disclosure relates generally to systems for detecting the position of an item. More particularly, the present disclosure relates to a method and a system for using Radio Frequency Identification (RFID) tags to determine the position of an item.

There are many contexts in which it is useful or even necessary to know the position of an item in the physical world. For example, logistics systems need to track the movements of goods through warehouses, and assembly robots need to determine the position of cars as they move down the assembly line. Applications of such knowledge are nearly countless, because knowing the position of objects is a fundamental requirement for interacting with the physical world.

One technique for determining the position of a physical object is to modify the object to so that it is able to track its own position, and to report its position through a wired or wireless connection. While this technique is useful for some applications, it does not lend itself to all such applications. The tracking apparatus may be bulkier than the item that is being tracked, thereby making it difficult or impossible to use in the particular environment in which the object may be located. The item or the tracking apparatus must contain a wireless communications system and a power supply, which further increases bulk, or be tethered through a physical connection. Moreover, it is expensive to modify an object in this way.

Another technique is to use a video camera to survey a scene, and to use object recognition software to identify and determine the location of objects within the scene. However, this technique is expensive and requires line of sight access to the camera.

A relatively inexpensive technique for determining the position of an object in the physical world is to attach a Radio Frequency Identification (RFID) tag to the object. RFID tags are relatively small, relatively inexpensive, and passive RFID tags do not require a power source. Each RFID tag has a unique identifier that can be read wirelessly by RFID tag readers. RFID tag readers do not require a direct line of sight to tags to be able to read them and typically has a range of few feet for the most popular and inexpensive passive tags. However, typical RFID tag readers cannot pinpoint the exact location of the object. Rather, they simply report the presence or absence of a tag in their field of sensitivity.

Conventionally, if an item having an RFID tag is to be located, the RFID tag reader would have to be transported around the area in which the item is thought to be in order to find the item. Alternatively, the area would be divided in sections, with each section having an RFID tag reader. The sections are sized such that any item within the area is always within range of one of the RFID tag readers. The problem with this method is that RFID tag readers are much more expensive than RFID tags, making this method for an expensive solution to implement, particularly for large archives.

Another problem with both of these conventional methods is that they assume that the user is familiar with the distribution of sections in the area. So even if the general location is known, for example the item is located in section H7, the user would still need to find where the section H7 is in the area. This is especially difficult for large areas/archives or archives that do not follow a simple way of classifying the sections. Further, even after the user finds the section of the area/archive that contains the item, he or she must still perform a sequential search in that section to locate the item. This is a time consuming operation for archives divided in large sections.

SUMMARY

There is provided a locating system for an archive having multiple objects stored therein, where each of the objects has an RFID tag. An RFID reader device includes an RFID reader to detect and read the RFID tags of the objects. A central processing unit includes a database to store information on each object in the archive, a location engine operating system in communication with the RFID reader device, and a data structure to store a relative position of each object in the archive relative to each other object in the archive.

The RFID reader device also includes an input mechanism to input information associated with an object to be located into the operating system and an output mechanism. The operating system accesses the data structure to obtain location information for the object to be located and displays the location information with the output mechanism.

The database includes descriptive information associated with each of the objects in the archive and an identifier associated with the RFID tag of each object in the archive.

The locating system may also comprise also central computer, with the database and data structure being stored on the central computer. In this event, the RFID reader device and central computer include a wireless communication system.

The locating system further comprises multiple landmark RFID tags fixedly disposed within the archive. Each of the landmark RFID tags is positioned at a distance from each other landmark RFID tag, whereby at least one of the landmark RFID tags is within a detection range of the RFID reader when the RFID reader device is within the archive.

There is also provided a method of locating an object within an archive containing multiple objects, each of the objects including an RFID tag having a unique identifier. An RFID reader device is carried through the archive, the RFID reader device having an RFID reader to detect and read the RFID tags. The RFID reader device determines whether there are any RFID tags within the range of the RFID reader and queries each RFID tag sensed by the RFID reader for the identifier associated with the RFID tag. It is determined whether the identifier for each RFID tag is an old identifier stored in a memory or a new identifier not stored in the memory. If one or more of the identifiers is a new identifier, a linkage is defined between each object associated with a new identifier and each other object within the range of the RFID reader device. Each linkage is saved in a data structure for storing the relative position of each object in the archive relative to each other object in the archive. Each new identifier is stored in the memory.

The method further comprises determining whether any object associated with an old identifier is no longer within range of the RFID reader device. Each old identifier associated with an object that is no longer within range of the RFID reader device is deleted from the memory.

The archive also may also contain at least one fixedly disposed landmark RFID tag. In this case, the method further comprises querying each landmark RFID tag sensed by the RFID reader for the identifier associated with the landmark RFID tag. It is determined whether the identifier for each landmark RFID tag is an old identifier stored in a memory or a new identifier not stored in the memory. If one or more of the identifiers is a new identifier, a linkage is defined between each landmark RFID tag associated with a new identifier and each object within the range of the RFID reader device. Each linkage is saved in the data structure and each new identifier is stored in the memory.

An object stored in the archive may be located by entering a search criteria for the object into the RFID reader device. As the RFID reader device is carried in the archive, each RFID tag sensed by the RFID reader is queried for the identifier associated with the RFID tag. The data structure is queried for linkages connecting the objects in the range of the RFID reader to the object to be found. The shortest distance to the object to be found is computed and displayed on an output mechanism of the RFID reader device. Movement continues in a first direction into the archive if the distance displayed on the output mechanism decreases. If the distance displayed on the output mechanism increases, movement continues in a second direction.

If an object is to be retrieved from the archive, the identifiers stored in the memory are compared to the linkages stored in the data structure. The RFID reader device determines that an object has been retrieved by determining that a linkage between that object and another object has been broken. This is identified when the linkages defined by the identifiers stored in the memory is less than the linkages stored in the data structure for the identifiers stored in the memory.

Determining the object that has been moved comprises comparing a listing of the identifiers associated with the objects of the linkages stored in the data structure, for the identifiers stored in the memory. The identifier of the listing that is missing from the memory is identified. The object having a linkage, stored in the data structure, with the object associated with the missing identifier is classified as the retrieved object.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
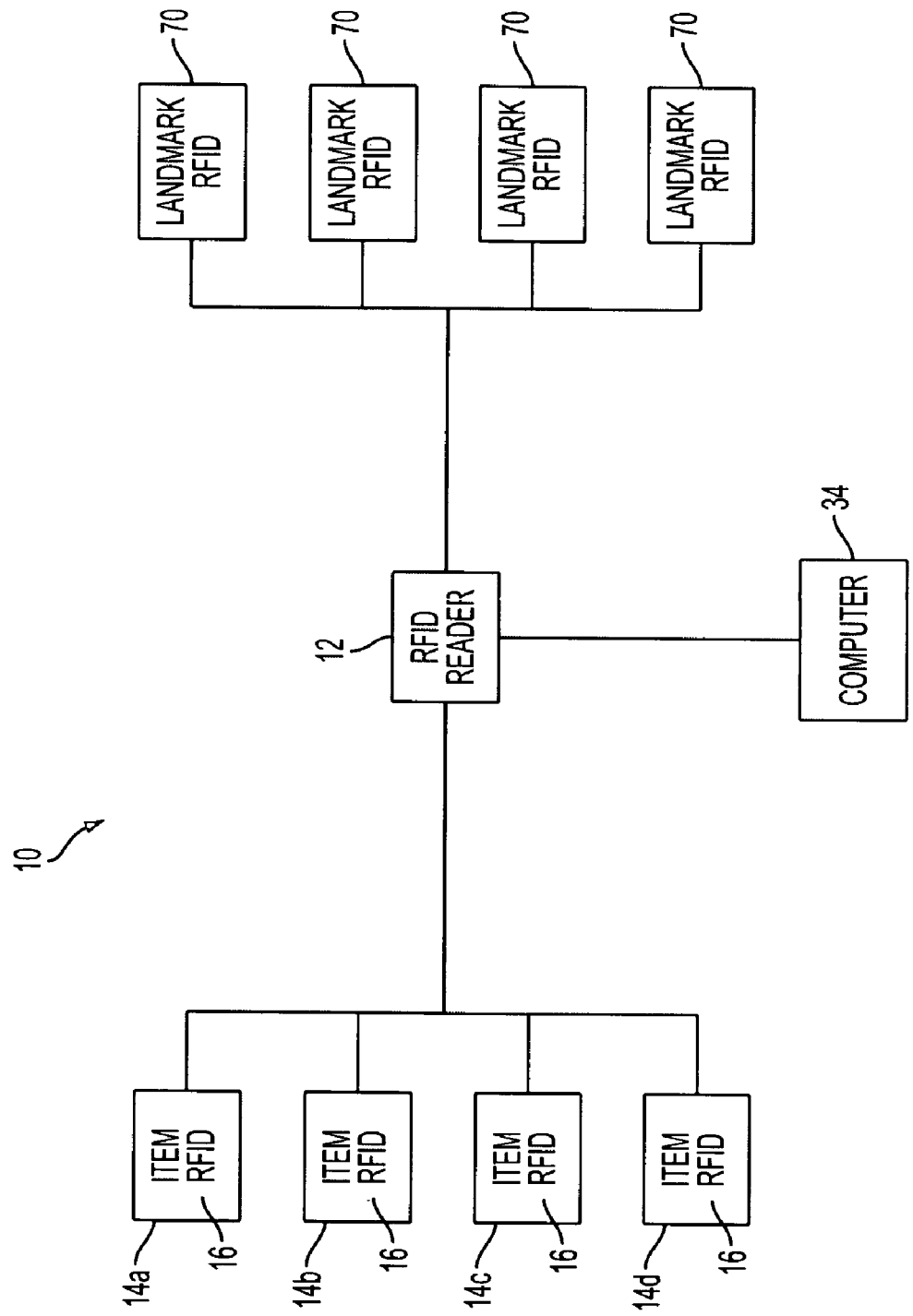
FIG. 1 is functional diagram of a locating system for items having RFID tags in accordance with the disclosure.

With reference to the drawings wherein like numerals represent like parts throughout the several figures, a locating system for items having Radio Frequency Identification (RFID) tags in accordance with the present disclosure is generally designated by the numeral 10. With reference to FIG. 1, the locating system 10 utilizes a portable RFID reader device 12 to identify items or objects 14 having an RFID tag 16, whereby the location of each such item/object 14 relative to each other item/object 14 within a given area or "archive" 18 may be mapped. As defined herein, an "archive" 18 is any area in which an item/object may be stored. For example, books 14' may be stored in a library 18', documents 14" may be stored in a file room 18", and goods 14'" may be stored in a warehouse 18'". In addition to conventional Radio Frequency Identification tags, the term "RFID tag" is hereby defined to include any item/object mountable device that may emit a unique identifier employing a wireless technology (e.g. ultrasound, infrared, etc.).

Figure 5:
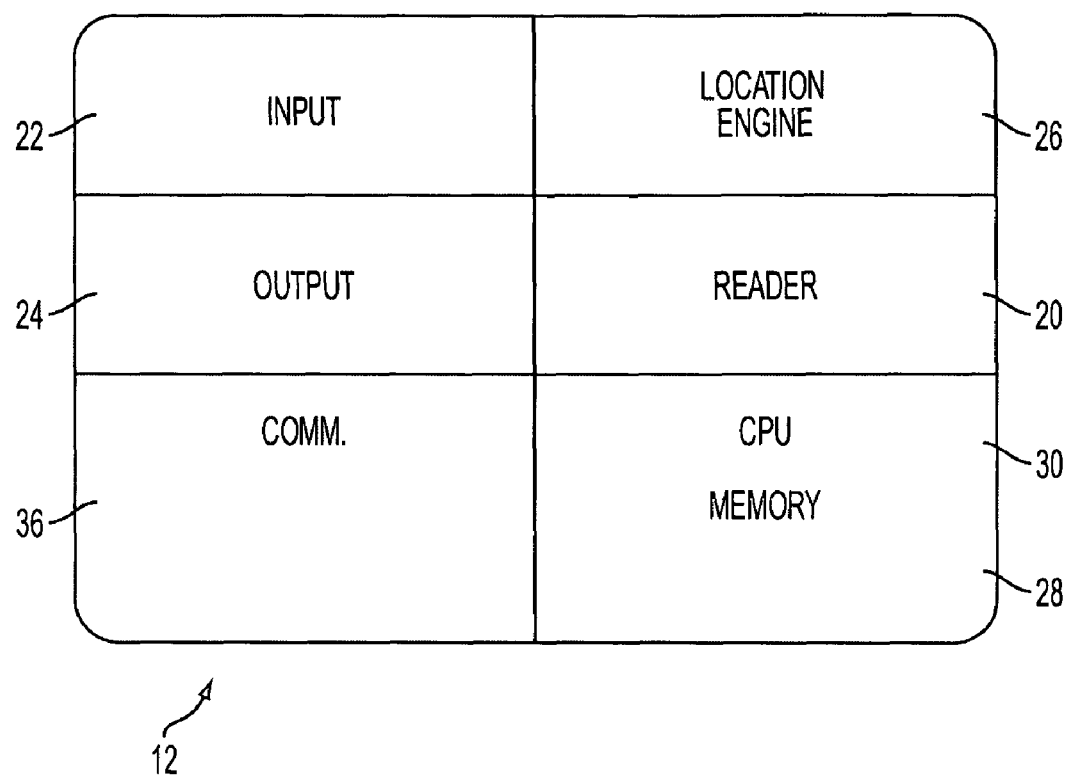
FIG. 5 is a functional diagram of an RFID detector in accordance with FIG. 1.

With additional reference to FIG. 5, the RFID reader device 12 includes a conventional RFID reader 20 for detecting the RFID tags 16 of the objects/items 14. An input mechanism 22 is used for entering the information about the items 14 that are to be located. The RFID reader device 12 also has an output mechanism 24, such as an LCD display, to provide the user with location information for finding the items 14. A location engine operating system 26 stored in onboard memory 28 controls a central processing unit (CPU) 30. The location engine 26 processes the information entered by the user via the input mechanism 22. The location engine 26 also controls the RFID reader 20, querying the reader 20 to obtain the unique identifiers of all the RFID tags 16 that are within the field/range 32 of the RFID reader 20, and processing the response from the RFID reader 20.

A database or "catalog" contains descriptive information about each one of the items 14 in the archive 18, along with the identifier stored in the item's RFID tag 16. As explained above, the location engine 26 receives input from the user identifying the item(s) that are to be found. Such input may comprise the identifier of the item(s) or some other information about the item(s) that could be used as query criteria to obtain the identifier or identifiers from the catalog. The catalog may be stored in the onboard memory 28 or in a central computer 34. If the catalog is stored in a central computer 34, the catalog may be accessed by the CPU 30 in real-time wirelessly or over a hard-wire connection via a communication device 36 or port, respectively. Alternatively, copies of the catalog and closeness network 38 may be maintained on each RFID reader device 12 and on the central computer 34, with the copies being synchronized on a periodic basis. This synchronization can happen using a wired communication channel such as USB or a short range wireless link such as an IR port. The catalog may be maintained solely on the central computer 34, if the memory 28 of the RFID reader device 12 does not have sufficient capacity. In this embodiment, the central computer 34 would communicate the unique identifier information for the items to be located to the RFID reader device 12.

Figure 2:
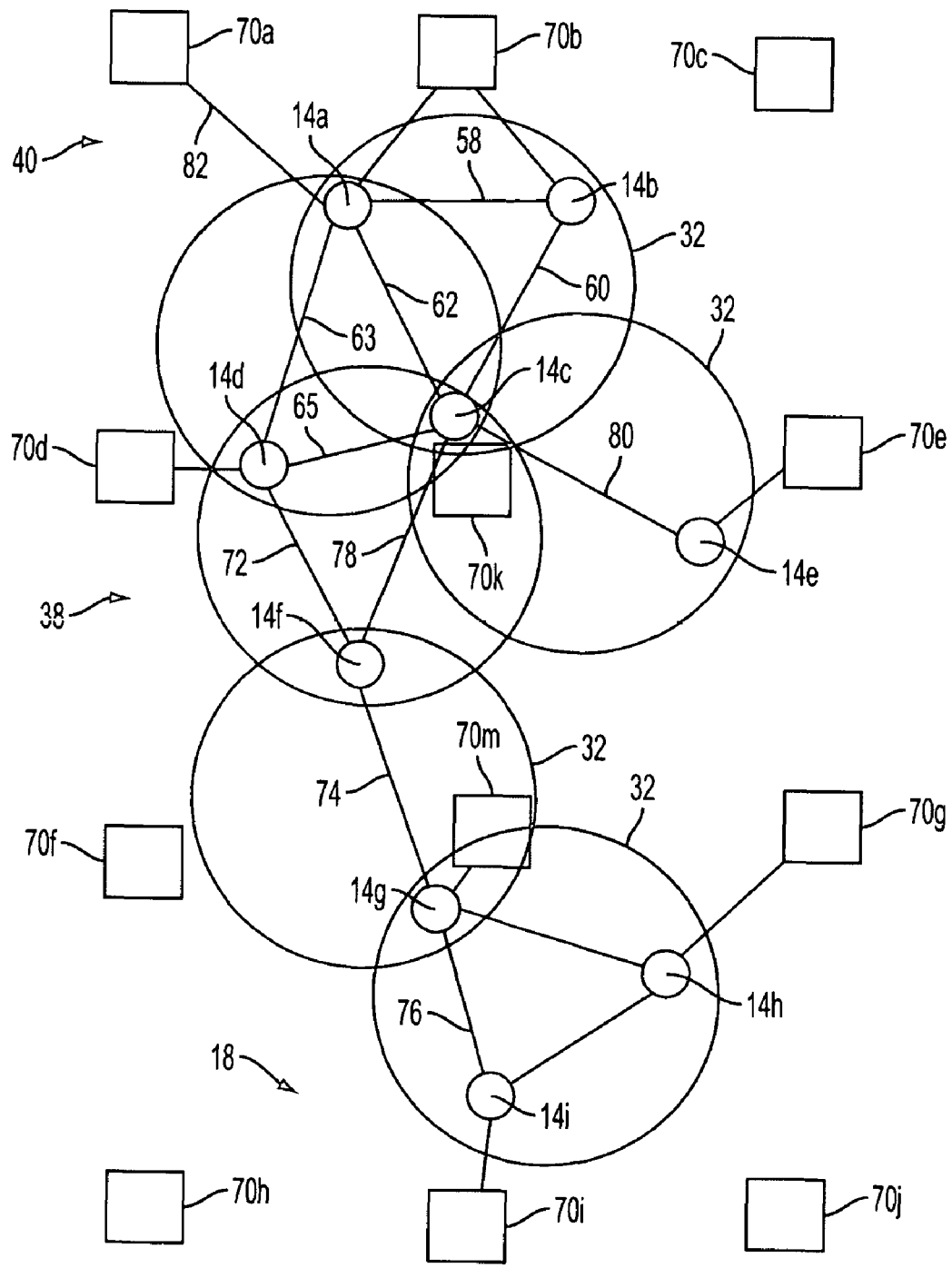
FIG. 2 is functional diagram of a closeness network in accordance with the disclosure.
Figure 6:
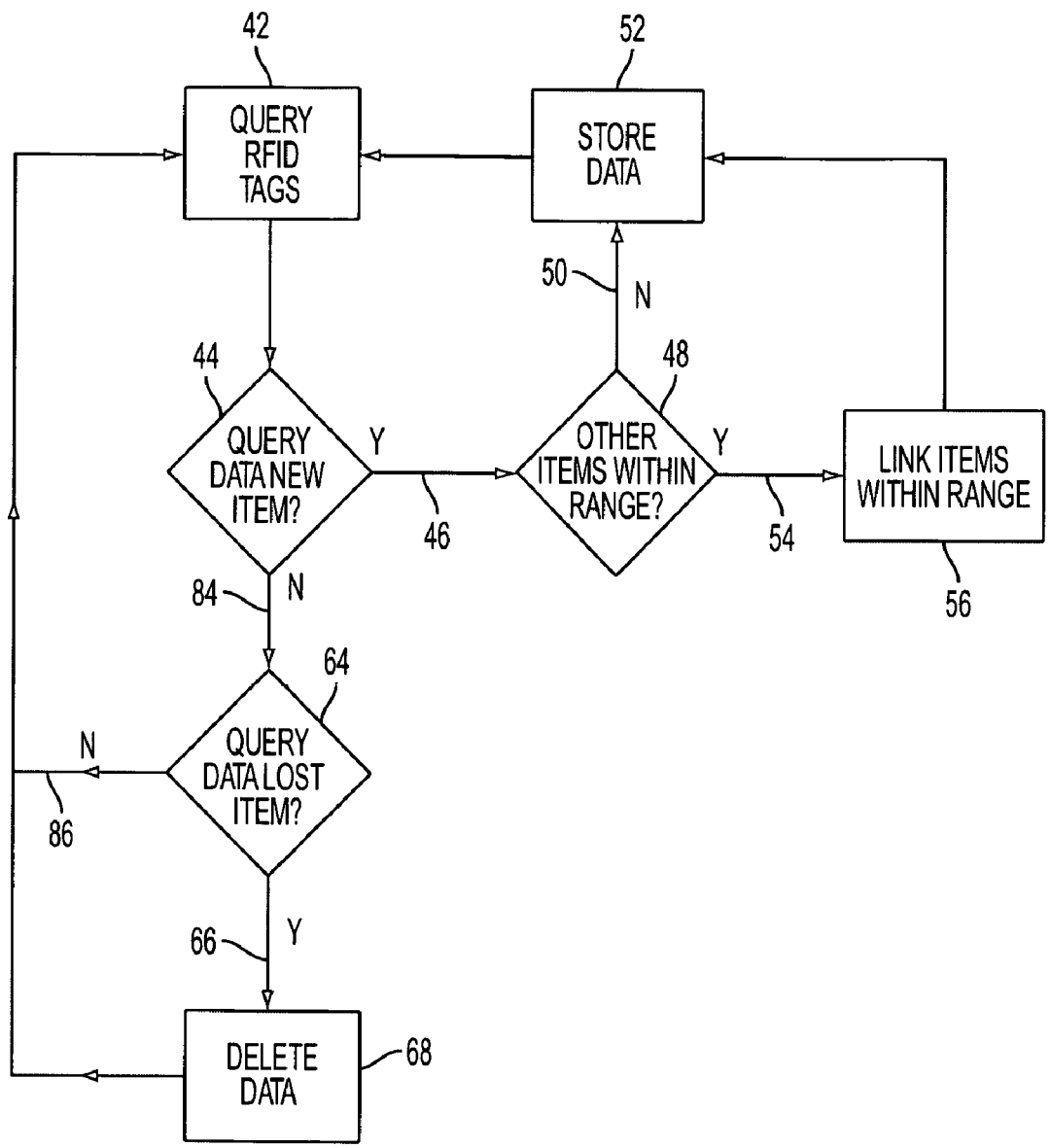
FIG. 6 is a flow diagram of a routine for establishing the closeness network of FIG. 2.

With reference to FIGS. 2 and 6, the locating system 10 includes a data structure 38 for storing information regarding the relative position of each item 14 in the archive 18 relative to each other item 14 in the archive 18. The location data for this "closeness network" data structure 38 is initially obtained by the user(s) carrying the RFID reader device 12 through the archive 18, with the RFID reader device 12 frequently querying for RFID tags 16 that may be within the range of the RFID reader 20. For example, if the user enters the archive 18 in the northwest corner 40, the RFID tag 16 associated with item 14a will be detected when it comes within the range 32 of the RFID reader 20. The RFID reader 20 queries 42 the RFID tag 16 associated with object 14a to obtain the unique identifier stored therein and the location engine 26 then queries 44 the memory 28 to determine whether the identifier for item 14a has already been stored therein. Since this the first time item 14a has been detected 46, the location engine 26 then queries 48 whether there are any other RFID tags 16 within range of the RFID reader 20, determines that only item 14a is within range 50, and stores 52 the identifier for item 14a in the memory 28 and in the closeness network 38.

As the user continues east-southeast into the archive 18, the location engine 26 verifies that item 14a is within range by repeatedly querying 42 the associated RFID tag 16 and comparing the identifier to the identifier(s) stored in memory 28. When items 14b and 14c come within the range 32 of the RFID reader 20, the RFID reader 20 queries 42 the RFID tags 16 associated with objects 14b and 14c to obtain the unique identifiers stored therein. The location engine 26 queries 44 the memory 28, and determines 46 that the identifiers for items 14b and 14c are not stored therein. The location engine 26 then queries 48 the RFID reader 20 whether there are any other RFID tags 16 within range 32. Since item 14a is 54 also within range 32, the location engine 26 links 56 items 14a, 14b, and 14c, stores 52 the identifiers for items 14b and 14c in memory 28 and in the closeness network 38 and stores 52 the linkages 58, 60, 62 between 14a, 14b, and 14c in the closeness network 38.

As the user continues to move within the area/archive 18, the location engine 26 will detect when one of the previously detected items 14 has fallen outside of the range 32 of the RFID reader 20. If for example, the user moves west, item 14b will eventually fall outside of the range 32 of the RFID reader 20. This will be detected by the location engine 26 when a comparison 64 of the identifiers stored in memory 28 and the identifiers sensed by a periodic query 42 of the RFID reader 20 reveals that the RFID tag 16 associated with item 14b is no longer being sensed. When this occurs 66, the location engine 26 deletes 68 the identifier for item 14b from memory 28.

If the user continues to move west, item 14d enters the field 32 of the RFID reader 20. The RFID reader 20 queries 42 the RFID tag 16 associated with object 14d, to obtain the unique identifiers stored therein. The location engine 26 queries 44 the memory 28, and determines 46 that the identifier for item 14d is not stored therein. The location engine then queries 48 the RFID reader 20 whether there are any other RFID tags 16 within range 32. Since items 14a and 14c are 54 also within range 32, the location engine 26 links 56 item 14d with items 14a and 14c, stores 52 the identifier for item 14d in memory 28 and in the closeness network 38 and stores the linkages 62, 63, 65 between 14a, 14c, and 14d in the closeness network 38.

The user must traverse the entire archive/area 18 to login each item 14, to establish the linkages between the items 14, and to login each such linkage. For example, if the user then moves south, item 14a falls outside of the range 32 of the RFID reader 20. Continued southward movement would cause item 14f to enter the field 32 of the RFID reader 20 and be logged in 52 as explained above. Alternatively, if the user then moves southeast, items 14a and 14b fall outside of the range 32 of the RFID reader 20. Continued movement causes item 14e to enter the field 32 of the RFID reader 20 and be logged in 52.

Figure 4:
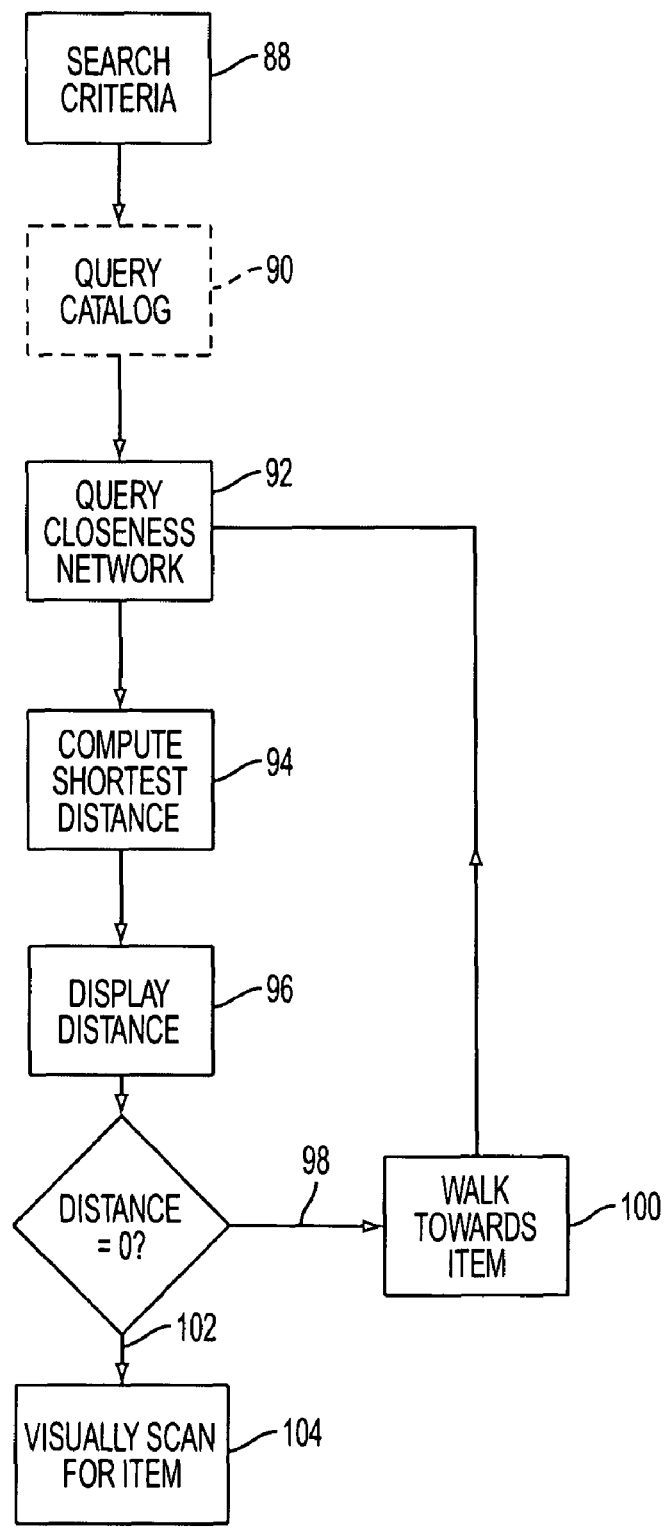
FIG. 4 is a flow diagram of a routine for finding a target item in the closeness network of FIG. 2.

The closeness network 38 provides a map of the location of each item 14 in the archive 18 relative to each other item 14 in the archive 18. For example, it is known from the closeness network 38 that item 14i is four (4) linkages 76, 74, 72, 64 away from item 14a, four (4) linkages 76, 74, 78, 80 away from item 14e, and four (4) linkages 76, 74, 78, 60 away from item 14b. With reference to FIG. 4, the relative position information stored within the closeness network 38 may be used to locate the physical position of any item 14 within the archive 18.

Assuming that the user enters the archive 18 in the northwest corner 40, he or she will enter the search criteria 88 for the object/item 14 to be found in the RFID reader device 12, via the input mechanism 22 (assume that the user is attempting to locate item 14e). This may be done on entering the archive 18 or just prior to entering the archive 18. The search criteria may be the unique identifier of the RFID tag 16 associated with the item 14 or data that could be used to query 90 the catalog and obtain the unique identifier of the item 14. As described above, upon entering the archive 18 the RFID tag 16 associated with item 14a will be detected when it comes within the range 32 of the RFID reader 20. The RFID reader 20 queries 42 the RFID tag 16 associated with object 14a to obtain the unique identifier stored therein and the location engine 26 then queries 44 the memory 28 to determine whether the identifier for item 14a has already been stored therein. Since this is not 84 the first time item 14a has been detected and item 14a is within range 86, no action is taken by the location engine 26 with respect to the stored data concerning item 14a.

Using the unique identifier for the RFID tag 16 associated with item 14e, the location engine queries 92 the closeness network 38 for data on item 14e and for data on linkages that would connect items 14 in the range 32 of the RFID reader 20 to item 14e. The location engine 26 then computes 94 the shortest distance to the item 14, in terms of the number of linkages to item 14, and displays 96 this distance on the output mechanism 24. In the subject example, there are two (2) linkages 62, 80 between item 14a and item 14e. If the distance is greater 98 than zero (0), the user walks 100 into the archive 18 while observing the distance displayed on the output mechanism 24.

As the user continues to move within the area/archive 18, the location engine 26 repeatedly queries 42 the location of items 14a, 14b and 14c, queries 92 the closeness network, computes 94 the shortest distance between items 14a, 14b, 14c and 14e, and displays 96 this distance on the output mechanism 24. If the user begins to move away from the target item 14e, the distance displayed on the output mechanism 24 will go up. If the user continues to move toward the target item 14e, the distance displayed on the output mechanism 24 will go down.

If for example, the user continues to walk 100 east-southeast into the archive 18, items 14b and 14c will come within the range 32 of the RFID reader 20. The RFID reader queries 42 the RFID tags 16 associated with objects 14b and 14c to obtain the unique identifiers stored therein. The location engine queries 44, 64 the memory 28, and determines 84, 86 that items 14b and 14c are not new and are within range. The location engine 26 queries 92 the closeness network 38 for linkages that would connect either item 14b or 14c to item 14e, computes 94 the shortest distance between items 14b or 14c and 14e, and displays 96 this distance on the output mechanism 24. In the subject example, there is one linkage 80 between item 14c and item 14e and two linkages 60, 80 between item 14b and item 14e. Accordingly, the distance displayed on the output mechanism 24 will now be one (1).

If the user continues to walk 100 southeast, items 14a and 14b will fall outside of the range 32 of the RFID reader 20, and eventually, item 14e will come into range 32 of the RFID reader 20. This will be detected by the location engine 26, as explained above. When item 14e comes into range, the location engine 26 queries 92 the closeness network 38 for linkages that would connect item 14e to the target item, computes 94 the shortest distance between 14e and the target item, and displays 96 this distance on the output mechanism 24. Since item 14e is the target item, the distance displayed on the output mechanism 24 will now be zero (0) 102. At this point, the user visually scans 104 the area for item 14e, which will be within the range 32 of the RFID reader 20.

If the user went southwest, instead of southeast, item 14b would fall outside of the range 32 of the RFID reader 20, item 14d would come into the range 32 of the RFID reader 20, the location engine 26 queries 92 the closeness network 38 for linkages that would connect item 14d to item 14e, computes 94 the shortest distance between item 14d and 14e, and displays 96 this distance on the output mechanism 24. In the subject example, there is one linkage 80 between item 14c and item 14e and two linkages 60, 80 between item 14b and item 14e. Accordingly, the distance displayed on the output mechanism 24 will now be one (2). Since the distance increased, the user would know that they had been proceeding in the wrong direction.

The locating system 10 may include one or more landmark RFID tags 70, located in fixed positions in the area/archive 18. In the archive 18 shown in FIG. 2, landmark RFID tags 70 are located around the periphery of the archive 18 and within the archive 18 such that one of the landmark RFID tags 70 is always within range 32 of the RFID reader 20 whenever the RFID reader device 12 is within the archive 18. The landmark RFID tags 70 provide fixed geographic reference points to which the objects 14 may be linked.

The landmark RFID tags 70 and the linkages between the landmark RFID tags 70 and the items/objects 14 are logged into the closeness network 38 in the same manner as the items/objects and the linkages between the items/objects are logged in. In the example discussed above, the landmark RFID tag 70a will be detected by the RFID reader 20 as the user enters the northwest corner 40 of the archive 18. The RFID reader 20 queries 42 the landmark RFID tag 70a to obtain the unique identifier stored therein and the location engine 26 then queries 44 the memory 28 to determine whether the identifier has already been stored therein. If this the first time landmark RFID tag 70a has been detected 46, the location engine 26 then queries 48 whether there are any other landmark RFID tags 70 or any RFID tags 16 within range of the RFID reader 20. Since the RFID reader device 12 has not been moved within range of any other RFID tags, the identifier for landmark RFID tag 70a is stored 52 in the memory 28 and in the closeness network 38.

As the user continues east-southeast into the archive 18, the location engine 26 repeatedly verifies that landmark RFID tag 70a is within range. When item 14a comes within the range 32 of the RFID reader 20, the RFID reader 20 queries 42 the RFID tag 16 associated with object 14a to obtain the unique identifiers stored therein. The location engine 26 queries 44 the memory 28, and determines 46 that the identifiers for item 14a is not stored therein. The location engine 26 then queries 48 the PRFID reader 20 whether there are any other RFID tags 16 within range 32. Since landmark RFID tag 70a is also within range 32, the location engine 26 links 56 item 14a and landmark RFID tag 70a, stores 52 the identifiers for item 14 in memory 28 and in the closeness network 38 and stores 52 the linkage 82 between item 14a and landmark RFID tag 70a in the closeness network 38. The loss of the link between landmark RFID tag 70a and item 14a, when landmark RFID tag 70a drops out of the range 32 of the RFID reader 20, is recorded as described above.

The fixed geographic reference points created by the landmark RFID tags 70 provide a number of benefits. First, the landmark RFID tags 70 are associated with a specific archive 18 and with the items 14 stored therein. Accordingly, a locating system 10 may be expanded to include numerous archives 18, each having numerous objects/items 14. On approaching any one of the archives 18, the RFID reader 20 will sense one of the RFID tags 16 associated with an object 14, one of the landmark RFID tags 70, or both, allowing the RFID reader device 12 to identify the specific inventory or items 14 stored therein. The user may then determine whether a target item 14 is located within that archive 18 by entering 88 the search criteria for the target item 14 and querying 92 the closeness network. The location engine 26 may provide directions to the appropriate archive, if it is determined that the target item 14 is not in the present archive. The search for a target item 14 within an archive 18 may also be simplified. When the location engine 26 computes 94 the closest distance to the target item 14, it may provide instructions on the direction to proceed in addition to the distance to the target item 14. In the example discussed above, the location engine 26 would instruct the user to proceed in the east-southeast direction from the northwest corner 40 to proceed to item 14e.

Figure 3:
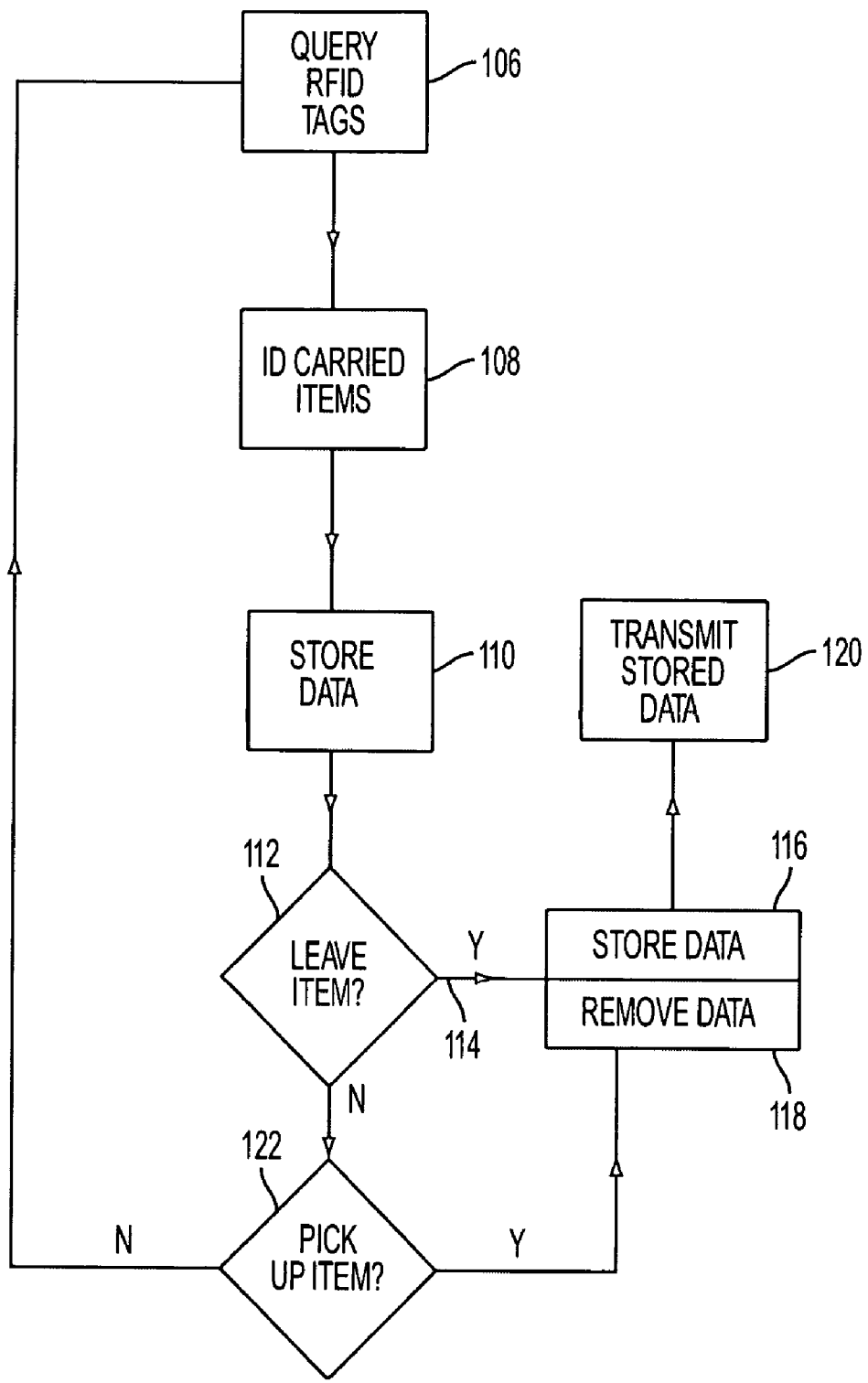
FIG. 3 is a flow diagram of a routine for maintaining the closeness network of FIG. 2.

The RFID reader device 12 is generally carried by the user whenever they enter an archive/area 18, and especially whenever an item is deposit in the archive 18 or removed from the archive 18. With reference to FIG. 3, the RFID reader 20 periodically queries 42, 106 all of the RFID tags 16, 70 within range 32, including the RFID tags 16 associated with any items 14' being carried by the user, and store 52 the identifier in memory 28. As described above, the location engine 26 determines 44 whether or not any of the items 14 in the archive 18 are new to the archive 18 and keeps track 64 of the items 14 that are within range 32 of the RFID reader 20. It should be appreciated that location engine 26 links 56 the carried item(s) 14' to each stationary item 14 and landmark RFID tag 70 that comes within range 32 of the RFID reader 20, and breaks the links as the stationary item 14 falls out of range 32, as the user moves within the archive. The location engine 26 identifies 108 the items 14' as being "carried" when such item 14' has been moved a distance of at least H linkages from one of the stationary items 14 in the closeness network. The value of H is a parameter in the system 10 that can be adjusted to avoid false positives. In general H=2 is a good choice for most of the cases. When the location engine 26 identifies 108 an item 14' as being carried, the "carried" status of item 14' is stored 110 within memory 28.

After the location engine 26 queries 106 the RFID tags 16, 70, it compares 112 the identifiers detected by the RFID reader 20 to those stored in memory 28. If the user deposits one of the items 14' in the archive 18, and then continues to move through the archive 18, item 14' will eventually fall out of the range 32 of the RFID reader 20. Accordingly, the comparison of the sensed identifiers to the stored identifiers will reveal that item 14' is no longer being carried 114, prompting the location engine 26 to store 116 the last recorded linkages between item 14' and stationary items 14 and landmark RFID tags 70, and remove 118 the "carried" status of the item 14'. If the closeness network 38 is being maintained on a remote computer 34, the linkages are stored 120 therein.

If a user retrieves a target item 14 or merely picks-up an item 14 in the archive 18 and continues through the archive 18, location engine will identify 122 the item as "carried" after a periodic query as described above. If the user leaves the archive 18 with the item 14, the location engine 26 removes 118 any linkages with the item 14 from the closeness network 38. If the user deposits the item 14 in a different location within the archive 18, the location engine 26 will detect this and update the linkages as described above.

It should be appreciated that the topology of the closeness network may be restricted so that items 14 can only be connected to landmark tags 70 and landmark tags 70 could be connected to items 14 or to other landmark tags 70. This would significantly reduce the number of linkages on the graph.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of locating an object within an archive containing a plurality of objects, each of the objects including an RFID tag having a unique identifier, the method comprising:
    moving an RFID reader device relative to the archive, the RFID reader device having an RFID reader adapted to detect and read the RFID tags of the objects, the RFID reader having a range for detecting and reading the RFID tags;
    determining whether there are any RFID tags within the range of the RFID reader;
    querying each RFID tag sensed by the RFID reader for the identifier associated with the RFID tag;
    determining whether the identifier for each RFID tag is an old identifier stored in a memory or a new identifier not stored in the memory, and if one or more of the identifiers is a new identifier:
        defining a linkage between each object associated with a new identifier and each other object within the range of the RFID reader device,
        saving each linkage in a data structure adapted to store a relative position of each object in the archive relative to each other object in the archive, and
        storing each new identifier in the memory,
    determining whether any object associated with an old identifier is no longer within range of the RFID reader device;
    deleting each old identifier associated with an object that is no longer within range of the RFID reader device from the memory;
    comparing the identifiers stored in the memory to the linkages stored in the data structure;
    determining that a linkage has been broken when the linkages defined by the identifiers stored in the memory is less than the linkages stored in the data structure for the identifiers stored in the memory; and
    determining which object of the broken linkage has been moved.

2. The method of claim 1 wherein the archive also contains at least one fixedly disposed landmark RFID tag, the method further comprising:
    determining whether there are any landmark RFID tags within the range of the RFID reader;
    querying each landmark RFID tag sensed by the RFID reader for the identifier associated with the landmark RFID tag; and
    determining whether the identifier for each landmark RFID tag is an old identifier stored in a memory or a new identifier not stored in the memory, and if one or more of the identifiers is a new identifier:
        defining a linkage between each landmark RFID tag associated with a new identifier and each object within the range of the RFID reader device,
        saving each linkage in the data structure, and
        storing each new identifier in the memory.

3. The method of claim 2 further comprising;
    determining whether any landmark RFID tag associated with an old identifier is no longer within range of the RFID reader device; and
    deleting each old identifier associated with a landmark RFID tag that is no longer within range of the RFID reader device from the memory.

4. The method of claim 1 further comprising:
    entering a search criteria for an object to be found into the RFID reader device;
    querying each RFID tag sensed by the RFID reader for the identifier associated with the RFID tag;
    querying the data structure for linkages connecting the objects in the range of the RFID reader to the object to be found;
    computing a shortest distance to the object to be found; and
    displaying the distance on an output mechanism of the RFID reader device.

5. The method of claim 4 further comprising moving in a first direction into the archive while observing the output mechanism of the RFID reader device and
    moving in the first direction if the distance displayed on the output mechanism decreases; or
    moving in a second direction if the distance displayed on the output mechanism increases.

6. The method of claim 5 further comprising visually scanning for the object to be located when the distance displayed on the output mechanism equals zero.

7. The method of claim 1 wherein determining the object that has been moved comprises:
    comparing a listing of the identifiers associated with the objects of the linkages stored in the data structure, for the identifiers stored in the memory;
    identifying the identifier of the listing that is missing from the memory; and
    classifying the object having a linkage, stored in the data structure, with the object associated with the missing identifier as a carried object.

8. The method of claim 1 further comprising deleting the broken linkage from the data structure.

* * * * *